G. A. HOLMES.
STUD AND SOCKET FASTENER.
APPLICATION FILED JUNE 3, 1921.
1,421,476.
Patented July 4, 1922.
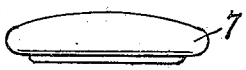
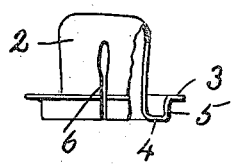
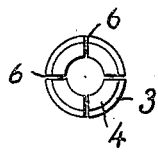
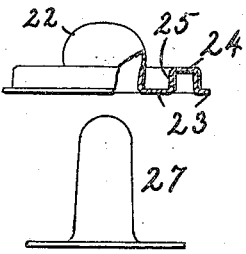
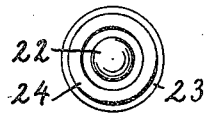
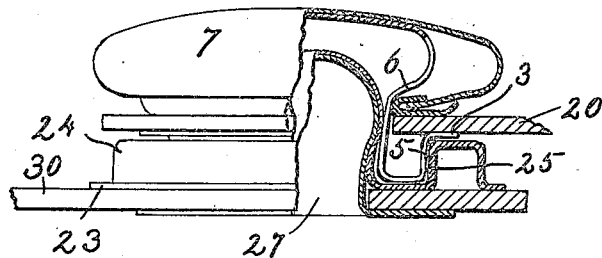
George A. Holmes INVENTOR.
BY
Joseph P. Livermore
ATTORNEY.

UNITED STATES PATENT OFFICE.

GEORGE A. HOLMES, OF NEWTON CENTER, MASSACHUSETTS, ASSIGNOR TO UNITED STATES FASTENER COMPANY, A CORPORATION OF MAINE.

STUD AND SOCKET FASTENER.

1,421,476.   Specification of Letters Patent.   Patented July 4, 1922.

Application filed June 3, 1921. Serial No. 474,818.

*To all whom it may concern:*

Be it known that I, GEORGE A. HOLMES, a citizen of the United States, and a resident of Newton Center, in the county of Middlesex and State of Massachusetts, have invented an Improvement in Stud and Socket Fasteners, of which the following description, in connection with the accompanying drawing, is a specification, like reference characters on the drawing designating like parts.

This invention relates to a stud and socket fastener of that kind in which the stud has a bulbous head a little larger than the entrance opening of the socket, and either the socket is resiliently expansible or the stud head is resiliently contractable, so that when the members are pressed together the stud will snap into the socket and will remain held therein until pulled outward by force sufficient to overcome the elastic force of the resilient member.

The object of the present invention is to increase the strength and durability of the fastener, and the invention consists mainly in providing each member of the fastener with a ledge or shoulder such that when the stud is engaged in the socket the said shoulders of the members will be interlocked, and will contribute to the resistance to the stresses on the fastener incident to the performance of its function of fastening parts together, and will protect the resilient member from distortion by unusual or excessive stresses.

Fig. 1 is a side elevation, partly in section, of the components of the socket member of a fastener embodying this invention, as they appear before being attached to the fabric or material to be fastened;

Fig. 2 a similar view of the components of the stud member;

Fig. 3 a side elevation, partly in section, on a much larger scale, of the two members, each attached to the fabric or material to be fastened, in fastening engagement with one another;

Fig. 4 a plan or face view of the socket looking toward the mouth or stud entrance; and Fig. 5 is a plan view of the stud member.

The component of the socket member containing the socket proper has a tubular body 2 which is closed at one end, the upper end in the position shown, and open at the other (lower) end to provide the mouth for the entrance of the stud.

A foot or base flange 3 surrounds the said socket mouth, but instead of having said flange extend directly from the socket mouth as is usual in fasteners of this type, the body 2 is extended below said base flange 3 and the socket mouth is directly surrounded by an outwardly projecting portion or flange 4 which is connected with the base flange 3 by an intervening tubular part 5 constituting an annular shoulder substantially at a right angle to the base flange, between the said base flange and the mouth of the socket.

The socket piece is split at one or more places to afford the resilient action for co-operation with the stud, the line of separation extending through the base flange 3, the ledge 4, 5, and into the body 2 as best shown at 6 in Figs. 1 and 4, and the socket member is secured to the fabric or material 20 (see Fig. 3) by passing the closed end of the socket body through a hole in the material and into the hollow cap 7 and pressing said components forcibly together, so that the body 2 collapses endwise and bulges laterally and interlocks with the cap 7 as is usual with this type of fastener.

The fabric 20 is engaged between the cap 7 and the base flange 3 of the socket piece in this operation of clinching the components of the socket member together so that the socket member remains securely attached to the fabric as shown in Fig. 3.

The component of the stud member (Fig. 2) which co-operates directly with the socket comprises the bulbous head 22 and the foot or base flange 23 surrounding the neck thereof and having an annular ridge 24 the inner surface of which constitutes a shoulder 25 substantially at right angles to the base flange and a triffle larger in diameter than the shoulder 5 which projects from the foot of the socket member.

The stud member may be attached to the fabric or material 30 in the usual way, as by passing the shank of the tubular rivet 27 through a hole in said material and clinching it in the head 22 of the stud member as shown in Fig. 3 so that the fabric is nipped between the base flange 23 of the stud and the flange of the rivet 27 of the stud member.

When the members are in engagement to fasten the parts 20, 30, as shown in Fig. 3, the annular ridge of the socket member will enter and be interlocked with the annular ridge of the stud member and the cylindrical shoulders 5, 25 co-operate with the stud head and socket proper in withstanding the stress or pull of the parts 20, 30, said shoulders preventing excessive expansion or spreading of the socket.

It will be understood that the interlocking ridges and their shoulders would serve a like purpose if the stud were the resilient member of the fastener.

I claim:

1. A stud and socket fastener comprising a socket member having a stud receiving socket and base flange and being provided with an annular ridge between the mouth of the socket and the base flange, said socket and ridge projecting from opposite faces of the base flange combined with a stud member having a bulbous head and a base flange provided with an annular ridge adapted to surround and co-operate with the ridge of the socket member.

2. A stud and socket fastener comprising a socket member adapted to be secured to one portion of the material to be fastened, and a stud member adapted to be secured to the other portion of the material, the said members being each provided with a cylindrical shoulder adapted to engage with the shoulder of the other when the members are in fastening engagement with one another.

GEORGE A. HOLMES.